June 1, 1937.  P. A. NEWMAN  2,082,591

RECORDER PRINT WHEEL

Filed March 30, 1934  2 Sheets-Sheet 1

INVENTOR.
Paul A. Newman
BY
Cornelius L. Ehret
his ATTORNEY.

June 1, 1937.  P. A. NEWMAN  2,082,591
RECORDER PRINT WHEEL
Filed March 30, 1934   2 Sheets-Sheet 2

INVENTOR.
Paul A. Newman
BY
Cornelius D. Ehret
his ATTORNEY.

Patented June 1, 1937

2,082,591

UNITED STATES PATENT OFFICE 2,082,591

RECORDER PRINT WHEEL

Paul A. Newman, Belmar, N. J., assignor to Leeds & Northrup Company, Philadelphia, Pa., a corporation of Pennsylvania Application March 30, 1934, Serial No. 718,137

4 Claims. (Cl. 234—66)

My invention relates to recorder print wheels and more particularly to those for use in recording apparatus in which it is desired to obtain, on a single chart, a plurality of records of as many variable quantities, the several records being distinct as to the record characters, or as to color, or both.

In certain of the arrangements of the prior art, a plurality of records are impressed upon a single record chart by a single recording character or stylus. Such records have often been very confusing because of the fact that the curves made by them have crossed and recrossed, whereas, it is desirable that the several records should be easily distinguished from each other.

Previous attempts have been made to avoid the above difficulty by providing a print wheel having a plurality of printing characters with a co-operating inking pad. These arrangements have, in general, added to the complexity of the recording apparatus, particularly so when it was desired to obtain records of different colors, involving use of multiple color ink pads.

It is an object of my invention to provide a new and improved recorder print wheel which will overcome the above-mentioned disadvantages of the arrangements of the prior art and which will be simple and reliable in operation and economical to manufacture.

It is another object of my invention to provide a new and improved recorder print wheel for a recording apparatus by means of which there may be obtained on a single recording chart a plurality of records distinct in record characters, or in color, or in both.

In accordance with my invention, there is provided for a recording mechanism a print wheel comprising an arbor and a plurality of compressible envelopes peripherally supported from the arbor and each adapted to contain a quantity of ink. Supported from the outer face of each of the envelopes is a suitable record character or figure for impressing upon the chart of the recorder suitable marks or indications which go to make up the complete record. By way of example only, the compressible envelopes may be made up of soft and elastic rubber and the record characters may comprise tubular members vulcanized in the envelopes and projecting therethrough and into communication with the ink within the envelope. If desired, the record characters associated with the several envelopes may have different patterns for making distinct records, or the several envelopes may contain distinctively colored inks and, in some cases, it may be desirable to utilize both of these expedients.

For a better understanding of my invention, together with other and further objects thereof, reference is had to the following description taken in connection with the accompanying drawings, and its scope will be pointed out in the appended claims.

Referring now to the drawings, Fig. 1 is a side elevation, partly in section, of a recorder print wheel embodying my invention;

Fig. 2 is a longitudinal sectional view, taken along the line A—A of Fig. 1; while

Figure 1:
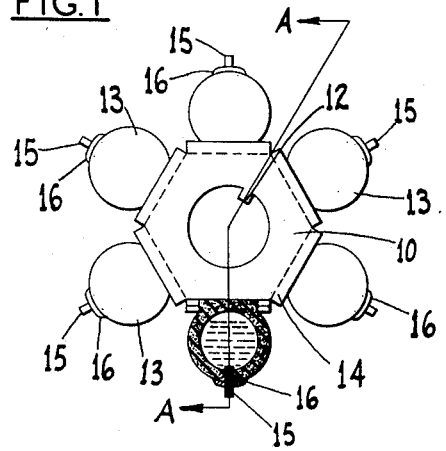
Figs. 1a and 1b illustrate, in side elevation, modified forms of the recorder print wheel of Fig. 1.
Figure 2:
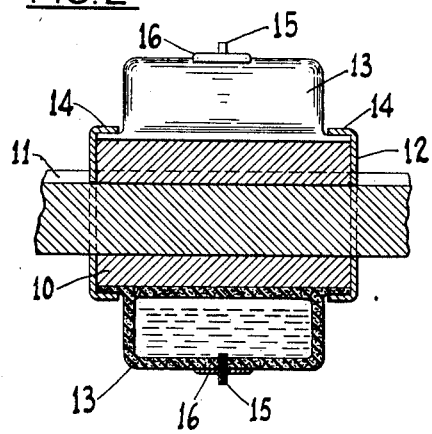

Referring now more particularly to Figs. 1 and 2, there is shown a recorder print wheel embodying my invention, comprising an arbor member 10, preferably polygonal in cross-section as, for example, hexagonal, as shown in the drawings, and drilled to receive a suitable shaft 11 and key 12. Upon the several faces of the arbor 10 are supported a plurality of collapsible or compressible envelopes 13. These envelopes may be of any suitable elastic or yielding material and, by way of example, may comprise sections of soft rubber tubing sealed at each end. The ends of the envelopes are secured to the arbor 10 by a pair of end clips 14 having flanges extending over the faces of the arbor 10, as shown. One or both of these end clips may be removable to facilitate the removal of the compressible envelopes 13.

Secured in the outer face or wall of each of the envelopes 13 is a record character or printing element 15, these elements 15 being symmetrically spaced about the axis of the arbor 10. The record characters 15 are preferably tubular members extending through the outer walls of their associated envelopes 13 and preferably vulcanized thereto by sealing or vulcanizing patches 16. The tubular record characters 15 project through the walls of the envelopes 13 into communication with the ink contained in these envelopes and preferably have a very small bore, in the nature of a capillary tubing, to prevent excessive feeding of the ink. The compressible envelopes 13 preferably contain quantities of distinctively colored inks, with the result that each of the record characters 15 is effective to make a record of distinctive color on the chart of the recorder mechanism.

Figure 3:
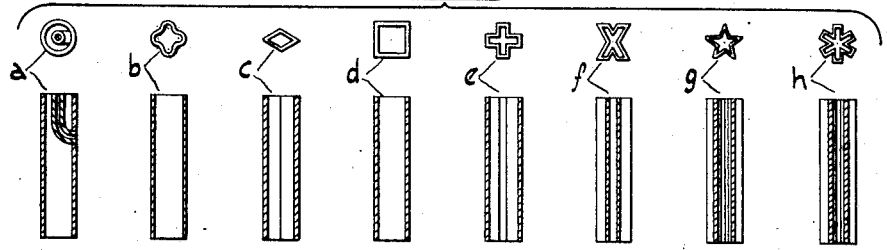
Fig. 3 represents a number of distinct record characters which may be utilized in the wheel of Figs. 1 and 2.

In certain instances, it may be desirable, in addition, to utilize distinctive record characters for the several compressible envelopes 13. A plurality of examples of such record characters are shown, on a greatly enlarged scale, in plan and longitudinal section, in Fig. 3. The character $a$ comprises an outer cylinder and an inner projection and will make an annular record mark. The record character $b$ comprises a corrugated cylindrical member and will produce a modified square. Record character $c$ is obviously of diamond cross shape, while record character $d$ will produce a square. Similarly, record character $e$ produces a cross, record character $f$ an X, and record characters $g$ and $h$ star shapes. Obviously, these record characters may be modified to produce any other suitable record marks in accordance with the requirements of the associated mechanism. If desired, these distinct record characters can be utilized in conjunction with envelopes filled with distinctively colored inks to obtain a number of distinct records equal to the product of the number of colors of ink and the number of record characters employed.

In operation of the above recorder print wheel, one of the end clips 14 is removed and each of the compressible envelopes is then disengaged from the other end clip and filled from a suitable ink container by inserting the record character 15 therein and compressing the envelope in a manner similar to that of filling an ordinary fountain pen. The envelopes may then be remounted on the arbor 10. As the several record characters of the print wheel successively engage the record chart, a slight compression forces a small quantity of ink from an envelope 13 through its tubular record character 15 to make an impression upon the chart. There is no air-lock of the ink in the compressible envelopes since the rotation of the print wheel periodically opens the envelopes to the atmosphere through the tubular record characters.

Figure 1A:
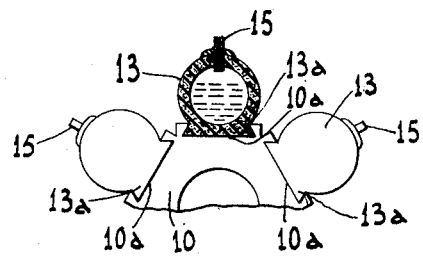
Figure 1B:
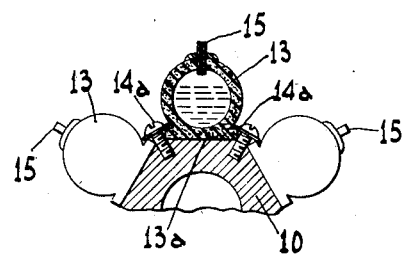

In Fig. 1a is shown a modified recorder print wheel in which the compressible envelopes 13 are secured to the arbor 10 by dovetailed longitudinal slots 10a formed in the arbor 10 and engaging longitudinal flanges 13a of the compressible envelopes 13. A still further manner of securing the envelopes to the arbor is shown in Fig. 1b in which the end clips 14 of Fig. 1 are replaced by longitudinal clips or strips 14a secured, as by screws, to the arbor 10 and engaging the flanges 13a of the envelopes 13.

Figure 4:
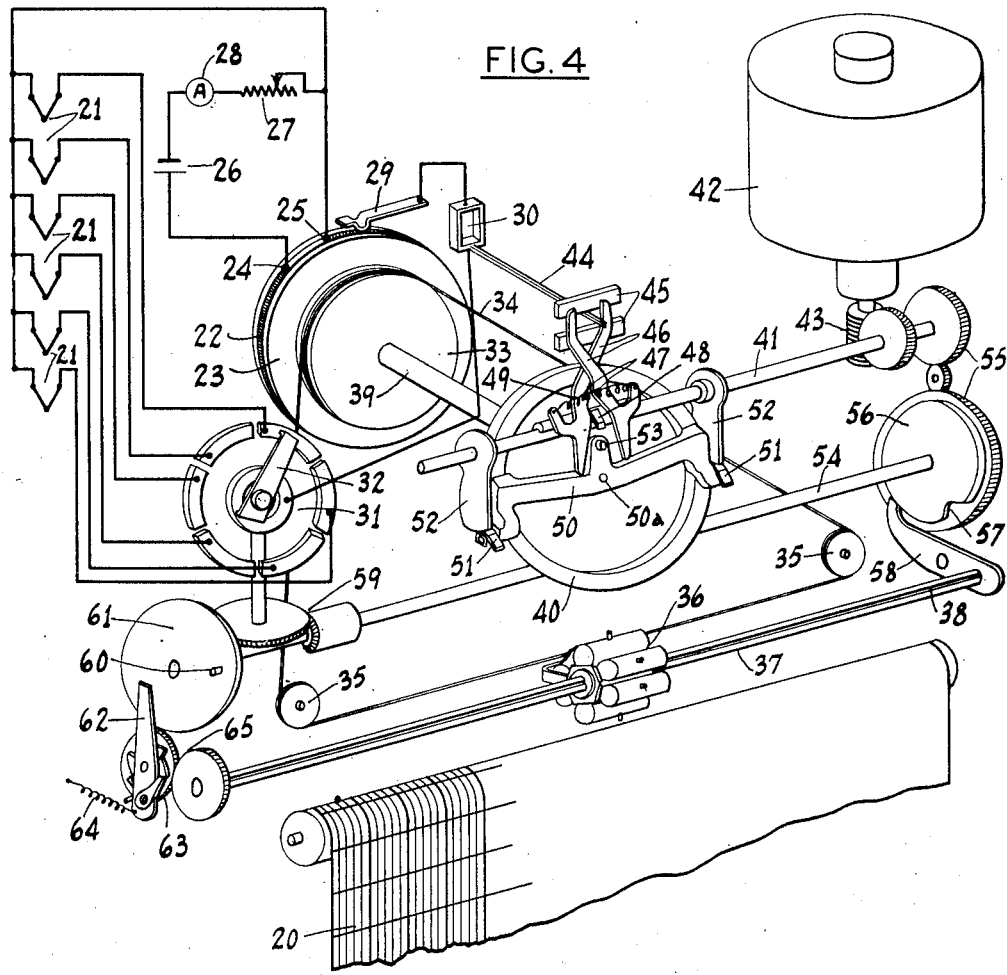
Fig. 4 illustrates an embodiment of my improved recorder print wheel in recorder apparatus.

By way of example only, there is illustrated in Fig. 4 recording mechanism to which my improved recorder print wheel may be readily applied. This mechanism is, in general, similar to that described and claimed in U. S. Letters Patent No. 1,935,732 granted November 21, 1933, upon the application of Lloyd Y. Squibb, modified to record a plurality of individual variable quantities by means of a recording mechanism similar to that disclosed and claimed in U. S. Letters Patent No. 1,125,699, granted upon the application of Morris E. Leeds. By means of this apparatus, there may be obtained upon a single record chart or markable element a plurality of distinct records of variations in temperature at a plurality of points, as indicated by the thermocouples 21. This apparatus includes a slidewire resistance or potentiometer 22 mounted on a rotatable disk 23 and provided with terminals 24 and 25 to which are connected a suitable source of current, such as battery 26, an adjustable calibrating resistance 27, and indicating device, such as an ammeter 28.

The several thermocouples 21 may be selectively connected in circuit with that portion of the potentiometer 22 between the terminal 25 and the stationary contact 29 through a galvanometer or indicating device 30 and a distributor switch 31, provided with a plurality of contact segments, each connected to a terminal of one of the thermocouples. The other terminals of the several thermocouples are connected together and to the circuit just described, which is completed at the rotating contact 32 of the distributor 31.

Since the angular position of the potentiometer slidewire 22 is a measure of the temperature of the particular thermocouple 21 in circuit at any particular time, as explained more fully hereinafter, its disk 23 is provided with a pulley 33 around which passes an endless cord or wire 34 which engages also the idler pulleys 35 and is attached to the recorder print wheel 36 which is of the type shown in more detail in Figs. 1 and 2. The print wheel 36 is slideable along a horizontal shaft 37 provided with a keyway 38 engaging the key 12 of the print wheel 36 (Fig. 1). The disk 23 is mounted on a shaft 39 carrying also a clutch disk 40. There is also provided a continuously rotating shaft 41 driven from a suitable motor 42 through gearing 43.

The indicating device or galvanometer 30 is provided with a deflecting needle 44 movable between a pair of cooperating clamping members 45, one of which is intermittently operated, to clamp between them the needle 44, by suitable mechanism driven by the shaft 41, omitted for the sake of clarity. Cooperating with the needle 44 is a pair of scissors-like arms 46 independently pivoted at the points 47. During that portion of the cycle of rotation of the shaft 41 in which the galvanometer needle 44 is free to move, the arms 46 are maintained separated by a suitable cam 48 driven by the shaft 41. When released by the cam 48, the arms 46 are closed together by a suitable biasing spring 49. Cooperating with the clutch disk 40 is a normally horizontal arm 50 pivoted at 50a and provided at its ends with clutch or brake shoes adjacent the rim of the disk 40, not shown in the drawings. The ends of the arm 50 carry cam surfaces 51 disposed in the path of the cams 52 mounted on the shaft 41.

The arm 50 has an upstanding portion carrying a pin 53 disposed for engagement by the lower arms of the members 46. The arm 50 is intermittently raised from engagement with the clutch disk 40 by suitable cam mechanism driven by the shaft 41, but omitted for the sake of clarity; it is disengaged during that portion of each cycle of rotation of shaft 41 during which the needle 44 is clamped between the members 45, and the members 46 are free to move under the influence of the biasing spring 49.

The motor 42 also drives an auxiliary shaft 54 through the gearing 43 and additional gearing 55. One of the members of the gearing 55 carries a cam 56 provided with a single cam detent 57 cooperating with a pivoted arm 58 which forms one support for the shaft 38 carrying the print wheel 36. The shaft 54 also drives the rotatable contact 32 of the distributor 31 through gearing 59. The gear ratio of the gearing 59 is such that the movable contact 32 is moved between successive contact segments for each revolution of the cam 56. The shaft 54 also drives a disk 61 carrying a pin 60 which engages a pivoted arm 52 of a suitable ratchet device 63, the arm 62 being biased to return to its normal position by spring 64. The ratchet wheel of the device 63 comprises an element of the gearing 65, the other element of which is attached to the shaft 38 carrying the print wheel 36.

The general principles of operation of the above-described apparatus will be well understood by those skilled in the art and may be found explained in detail in the above-mentioned Squibb and Leeds patents. In brief, for any particular position of the distributor 31, one of the thermocouples 21 is connected with such a polarity that its electromotive force is in opposition to that of that portion of the potentiometer included between the stationary contact 29 and the terminal 25. If these electromotive forces are unequal, the needle 44 of the galvanometer 30 will deflect by an amount and in a direction dependent upon the difference between them. The adjustment of the parts is such that, as the contact 32 makes contact with a particular segment, the arms 46 are separated by the cam 48 so that the needle 44 is free to deflect in accordance with the above-mentioned difference in electromotive force.

After a short interval, adequate for the needle 44 to assume its final position, the needle 44 is clamped in its deflected position between members 45, one of which by suitable cam and linkage mechanism is operated by the shaft 41. Simultaneously, the arms 46 are released, and if the needle 44 has deflected, as described above, one of the arms will engage the needle 44 before the other when returning to their normally-closed position. The spring 49 is then effective to move the arms 46 about their respective pivots and the lower arm of one of the members will engage the pin 53 of the arm 50 which is, at this point in the cycle, released from engagement from the clutch disk 40 by suitable cam mechanism, not shown, driven from the shaft 41. The arm 50 will then be moved through an angle proportional to the deflection of the needle 44 and will then reengage the clutch disk 40. The rotating cams 52 then engage that particular one of the cam surfaces 51 which has moved upwardly, and returns the arm 50 to its normal horizontal position, at the same time moving the clutch disk 40 and the connected potentiometer slidewire 22.

If the above-described movement of the slidewire 22 is insufficient to balance the galvanometer 30 for the particular temperature obtaining at the thermocouple connected in circuit therewith, the above-described operation will be repeated. Conversely, if the adjustment of the slidewire 22 has been too great, causing a deflection of the needle 44 in an opposite direction, the above-described operation will be repeated in an opposite sense. After a predetermined number of such cycles, preferably a number adequate to secure a balancing of the galvanometer 30, which number will be dependent upon the various constants of the system, the pivoted arm 58 engages the cam detent 57 and moves about its pivot, allowing the print wheel 36 to fall into momentary engagement with the scale chart 20 and make a record or impression thereon. Immediately thereafter, the pin 60 on the disk 61 engages the arm 62 which operates the ratchet mechanism 63 to rotate the shaft 37 and the print wheel 36 through an angle sufficient to bring the next record character of the print wheel 36 into position for subsequent recording on the chart 20.

The above-described operations take place while the movable contact 32 is moving over one contact segment of the distributor 31. As the arm 32 moves into engagement with the successive contact segment, the operation is repeated to balance the galvanometer for the successive thermocouple 21 and to operate the print wheel 36 to make a record of the temperature of this latter thermocouple. In this manner, the several thermocouples 21 are selectively and successively connected in circuit with the indicating galvanometer 30 and distinct records are made upon the chart 20 of the temperature of the several thermocouples, these records being distinct either in character or in color, or both, in accordance with the features of the record print wheel described above.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

I claim:

1. In a recording apparatus including a record chart, the combination of a print wheel comprising an arbor, a plurality of collapsible envelopes peripherally disposed about said arbor, each adapted to contain a quantity of ink, a pair of clips engaging said envelopes and securing them to said arbor, one of said clips being removable, whereby the envelopes can be removed and refilled, a record character supported from each of said envelopes and in communication with ink contained therein, and rotatable means for moving a selected one of said envelopes against said chart to collapse the envelope an amount sufficient to force therefrom a small quantity of ink.

2. In a recording apparatus, an elastic envelope, adapted to contain a quantity of ink, said envelope having outwardly extending flanges, a recording member formed at one end to represent a character and including a tubular member secured to the outer wall of said envelope, said member providing a passageway for flow of ink from said envelope to said character, an arbor, retaining means associated with said flanges and said arbor for retaining said envelope thereon in fixed position, and means for moving said arbor and envelope to a recording position, the elasticity of said envelope permitting relative movement between said recording member and said arbor.

3. In a recording apparatus having a record chart, the combination of an elastic self-filling envelope adapted to contain a quantity of ink, a tubular recording member, formed at one end to represent a character, secured to the wall of said envelope in communication with the ink contained therein, and means associated with said envelope on the side thereof opposite said recording character for moving said character against said record chart and for compressing said elastic envelope an amount sufficient to force therefrom a small quantity of ink thereby to print said character on the record chart.

4. In a recording apparatus including a record chart, printing means for producing a plurality of records upon a chart comprising a horizontally disposed arbor, a plurality of compressible envelopes, a pair of clips secured to said arbor for peripherally supporting said envelopes therefrom, each of said envelopes containing ink, a recording character supported from each of said envelopes, a passageway for flow of ink from each of said envelopes to its associated recording character, means for moving said arbor and a selected one of said recording characters against said record chart with sufficient force to compress its associated envelope to force ink to the recording character, and means for rotating said arbor after each character engages said chart to expose in succession said passageways to atmosphere and thereby prevent air-lock of the ink within said envelopes.

PAUL A. NEWMAN.